(12) United States Patent
Tong

(10) Patent No.: US 10,681,247 B1
(45) Date of Patent: Jun. 9, 2020

(54) METHODS AND SYSTEM OF DEVICES FOR MANAGING CONFIDENTIAL DOCUMENTS HAVING REDACTED INFORMATION

(71) Applicant: Kyocera Document Solutions Inc., Osaka (JP)

(72) Inventor: Samantha Tong, Walnut Creek, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 16/277,126

(22) Filed: Feb. 15, 2019

(51) Int. Cl.
*H04N 1/00* (2006.01)
*H04N 1/44* (2006.01)
*G06K 9/00* (2006.01)
*G06F 3/12* (2006.01)

(52) U.S. Cl.
CPC ......... *H04N 1/4446* (2013.01); *G06F 3/1222* (2013.01); *G06F 3/1238* (2013.01); *G06K 9/00449* (2013.01); *G06K 9/00463* (2013.01)

(58) Field of Classification Search
CPC ............. H04N 1/4446; G06K 9/00449; G06K 9/00463; G06F 3/1222; G06F 3/1238
USPC ....................................................... 358/1.14
See application file for complete search history.

(56) References Cited

U.S. PATENT DOCUMENTS

| 8,130,951 B2 | 3/2012 | Tian |
| 2014/0012719 A1* | 1/2014 | Schrichte ............... G06Q 10/00 705/34 |

* cited by examiner

*Primary Examiner* — Saeid Ebrahimi Dehkordy
(74) *Attorney, Agent, or Firm* — Millen, White, Zelano & Branigan, P.C.; William Nixon

(57) ABSTRACT

A system of devices receives and stores documents based on confidential information redacted from the documents. An electronic document is analyzed to identify character blocks having confidential information. The confidential information can be in different formats within the document. Redaction rules are applied to the character blocks to identify confidential categories for the confidential information within the blocks. The confidential information is redacted based on the rules such that the confidential information is removed from the document. A new electronic document is generated with the information redacted such that it is not viewable or printable. The two documents with different levels of confidential information is then stored on separate devices within the system.

20 Claims, 7 Drawing Sheets

US 10,681,247 B1

METHODS AND SYSTEM OF DEVICES FOR MANAGING CONFIDENTIAL DOCUMENTS HAVING REDACTED INFORMATION

FIELD OF THE INVENTION

The present invention relates to scanning and storing of documents having confidential information within a system of devices or image forming apparatuses.

DESCRIPTION OF THE RELATED ART

In some office environments, users scan or print a document that includes sensitive/confidential information. A user may want to redact that information, especially if the document is to be stored on a system with a plurality of image forming apparatuses. A user must take several measures when removing or hiding confidential information on a scanned, faxed, or to-be-copied document. In order to avoid disclosure of confidential information, the user uses post-it notes, tape, correction fluid, or stickers to block it from being reproduced or viewed in a subsequent document. Another way to hide the confidential information is to make a soft copy of the document, edit it through a document-editing software program on a computer, and then reprint the corrected, edited, or fixed document. All of these tasks take time and resources, many times away from the printer or scanner. Further, a computer or appropriate office supplies may not be available to use. The resulting document also looks unprofessional in the case of using post-it notes and the like. Moreover, the user must rescan or enter the document into the system to keep the original document from being available to other users.

SUMMARY OF THE INVENTION

A system of devices is disclosed. The system includes a plurality of devices comprising a first device having a first security status and a second device having a second security status. The system also includes a processor in communication with the plurality of devices. The system also includes a memory coupled to and readable by the processor. The memory is configured to store a set of program instructions which, when executed by the processor, configures the processor to receive a first electronic document having at least one character block having confidential information with a plurality of character blocks. The processor also is configured to identify the at least one character block within the first electronic document. The processor also is configured to redact the at least one character block from the first electronic document according to a confidential document redaction rule. The processor also is configured to generate a second electronic document, based on the redacted at least one character block of the first electronic document. The processor also is configured to store the first electronic document at the first device according to the first security status and store the second electronic document at the second device according to the second security status.

A method for generating at least one document having confidential information in a system of devices also is disclosed. The method includes receiving a first electronic document having at least one character block having confidential information within a plurality of character blocks. The method also includes identifying the at least one character block within the first electronic document. The method also includes redacting the at least one character block from the first electronic document according to a confidential document redaction rule. The method also includes generating a second electronic document, based on the redacted at least one character block of the first electronic document. The method also includes storing the first electronic document at a first device according to the first security status and storing the second electronic document at a second device according to the second security status.

A method for redacting confidential information from a document to generate a plurality of electronic documents also is disclosed. The method includes receiving a scanned document having a plurality of character blocks. The method also includes identifying a first character block and a second character block in the scanned document. The method also includes redacting the first character block from the scanned document. The method also includes generating a first electronic document without the redacted first character block having a first confidential status. The method also includes redacting the second character block from the scanned document. The method also includes generating a second electronic document without the redacted second character block. The second electronic document has a second confidential status. The method also includes storing the first electronic document on a first device and the second electronic document on a second device.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1:
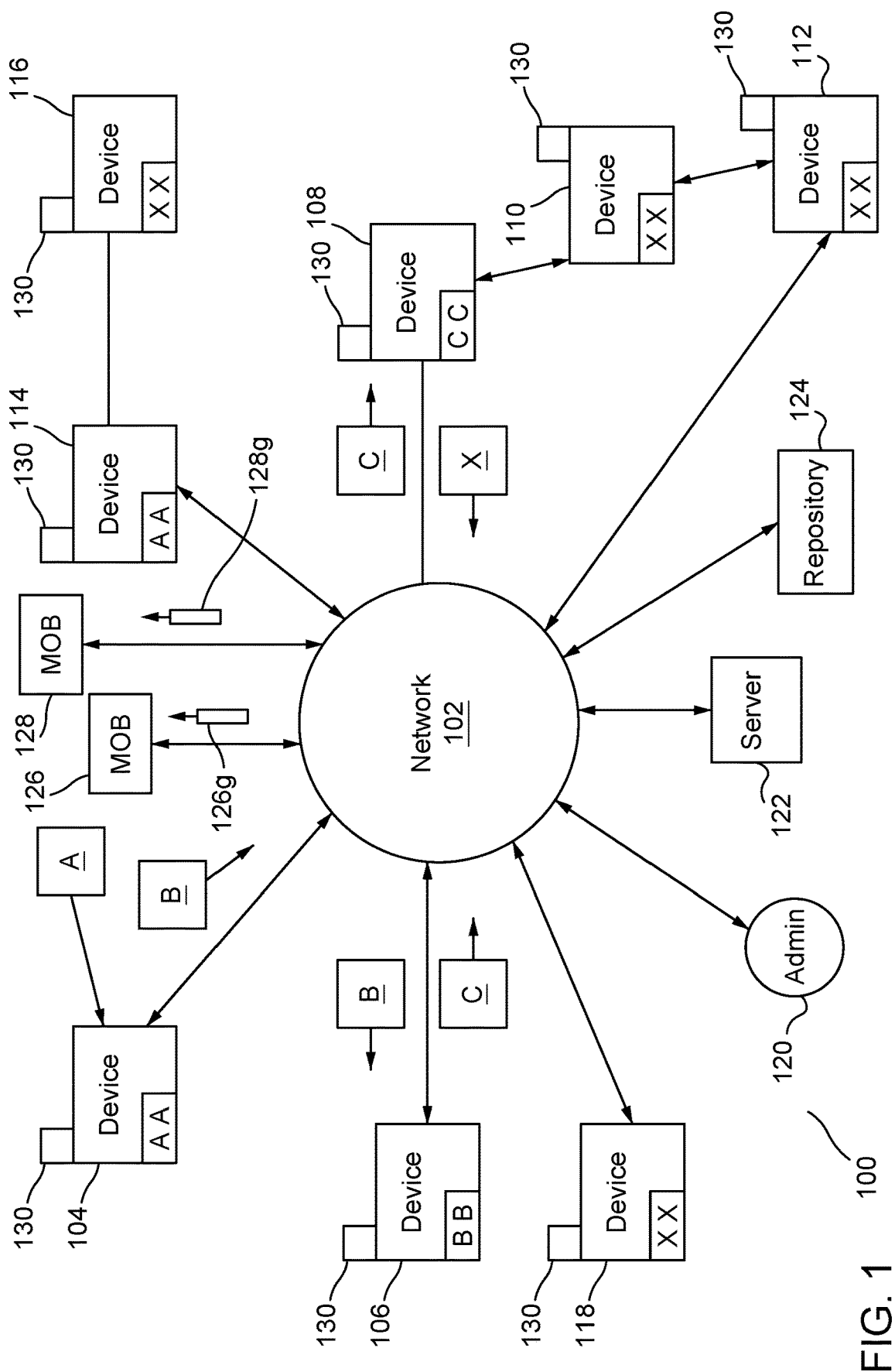
FIG. 1 illustrates a system for handling confidential documents according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments provide an application along with computer architecture that may scan a file and allow a user to redact sensitive information automatically. The user may print or store the redacted version of the scanned file. The image forming system includes a plurality of image forming apparatuses. In some embodiments, there may be at least three image forming apparatuses in the system. Each image forming apparatus stores a different version of the redacted confidential document. Thus, the need to memorize passwords or log-in information for different security levels is not needed. The disclosed system may reduce the time and worry with processing and storing documents with confidential information.

An example system of image forming apparatuses includes a first image forming apparatus that has an original document. The image forming apparatuses also may be known as printing devices, scanning devices, or devices. The system also includes a second image forming apparatus having a redacted document, wherein the confidential information is redacted. The first image forming apparatus is accessible by an administrator with a higher level of permission to view or print the original document. The second image forming apparatus is accessible by most other employees that only have access to the redacted document. The second level of security permission cannot access the redacted confidential information in the original document stored at the first image forming apparatus.

An example process may be from a user's point of view. The original owner of the document may scan the file at the first image forming apparatus. A device running the application may execute to perform the functions disclosed below. The device may detect categories, such as names, dates, locations, prices, identification numbers, personal information, and the like. The original owner then may specify the image forming apparatuses or devices that can view what types of information. For example, device A can view names and dates. Device B cannot view any names, dates, or locations. The original owner also may specify an expiration date of the document or what time or period that the file can be accessed. An instruction may specify that the document will expire in X days or that the document may be accessed only during working hours. Devices may be categorized as either an individual device or a group device. An individual device may belong to one user and will require no further authentication to access documents. A group device may require authentication to access documents. For example, an individual device may be a mobile smartphone while a group device may be an image forming apparatus.

Another example process may include scanning a document. The user goes to an image forming apparatus and opens an application, such as the KYOCERA Confidential (KC) HyPAS™ application. The user logs in with a username, personal identification number, biometric information, and the like along with a password. The user also may log in to the apparatus using a one-time guest use. The user scans a few pages and the document with the confidential information is stored on the image forming apparatus. The application detects several categories in the document, such as names, dates, locations, prices, personal information, and the like.

The user then may print the redacted confidential document. The user also may send the confidential document over the system, possibly for storage in other image forming apparatuses. The user can set multiple confidential levels. The user also can set what types of information is available for each level, can set how to access the documents, such as personal identification numbers, QR or other graphic codes, barcodes, and the like. The user also can specify which users have access from a user list.

For example, the user may set three levels of access. Level 1 access may retrieve only dates in the document. Level 2 access may retrieve dates and names in the document. Level 3 access may retrieve the entire document. Access also may be set for once or multiple times. The document will be deleted after being accessed once or after a certain date, or whichever occurs first. The document also may be deleted after a certain date, no matter how many times it is accessed. It also may be deleted after a certain number of days of being available. The user also may set an access time, such as the document may be accessed during working hours, accessed only on weekdays, only during the morning hours, or accessed anytime. The user also may indicate access locations. The document may be accessed only from specified devices or image forming apparatuses, only access from devices connected to the network, or accessed from anywhere. The user also can save scan settings as a template so that the user may select the template instead of reentering or inputting the same settings when scanning.

In some embodiments, the user receives document codes that may be used. If the access type is set as a personal identification number (PIN), barcode, QR or other graphical code, then the PIN, barcode, QR or other graphical code corresponds to a specific confidential level. The user is allowed to email a code to other users that then allow them to use the code to access the proper level of security. If access type is set as a specific user, then the specified user will be able to access the document after logging into his/her account. Once logged in, the user may view the following details of the document, such as when the document was accessed, from which device or image forming apparatus the document was accessed, or who accessed the document, such as a guest or unknown user or a specific user.

Some embodiments also relate to accessing a document by a specific user. The user logs into the application with the appropriate identification, such biometric, PIN, username, and the like plus a password. The user can see a list of files being shared with him or her. The user may then input a code or PIN to access a document within the list. The user, if allowed, then may print the document. The user also may access the document as a one-time user.

An "administrator" may refer to someone who has a high level of access or control. The administrator also is a user. The administrator may go to an image forming apparatus and opens the confidential application. The administrator may log in as a device or image forming apparatus administrator.

The steps disclosed by the processes below may be performed in a first image forming apparatus, or multi-functional printer (MFP). In this case, the first electronic document is a scanned document or an electronic document stored in a repository, such as a confidential document managing repository. This repository may reside in one or more image forming apparatuses. The repository also can be an external database that is accessed by the image forming apparatuses. In some embodiments, a server acts as a confidential document managing server that executes the steps. The term "processor" may refer to one or more processors. The processes disclosed below may be executed by one processor at an image forming apparatus or another processor at another image forming apparatus connected to the image forming apparatus. The processor also may refer to a processor on the connected server or a distributed processing network.

The redaction of information may include retrieving confidential information format data from a confidential document management repository. The confidential format data includes one or more formats of confidential items that corresponds to one of a plurality of confidential categories. For example, confidential items within a scanned document may include Jeff Smith (name), 111-22-3333 (government identification number), 202-555-1243 (phone number), 1234-567890 (bank account number), 26 Nov. 1970 (birth date), and the like. The confidential items will have a confidential information format, such as XXX-XX-XXXX for government identification number, XXX-XXX-XXXX for phone number, and the like. Confidential categories may include user name, government identification number, phone number, back account information, date of birth, and the like.

The first electronic document is analyzed. This analysis may include performing an optical character recognition on the first electronic document to obtain an optically-recognized representation of the first electronic document. At least one character block presented on the optically-recognized representation of the first electronic document is determined. The at least one character block includes one or more alphanumeric characters. The character block is compared with one or more formats of the confidential information. The comparison determines at least one confidential character block from the recognized character blocks. The confidential character blocks include confidential information.

The disclosed embodiments also identify one or more confidential categories of the at least one confidential block based on the comparison. A confidential category may be related to various confidential terms commonly found in the documents, such as name, address, phone number, identification number, age, and the like. The disclosed system then retrieves one or more alternative objects associated with the confidential categories from the confidential document managing repository. The alternative objects are stored associated with the respective confidential category in the confidential document managing repository. Using this data, a second electronic document is generated by electronically layering the one or more alternative objects on the respective confidential objects.

This process also may be used in conjunction with additional features to store, access, print, modify, and the like for the electronic documents. For example, a third electronic document may be generated that is in between security levels for the first electronic document and the second electronic document. The different electronic documents may be stored at different image forming apparatuses having the different security levels for access.

FIG. 1 depicts a system 100 for handling confidential documents according to the disclosed embodiments. System 100 includes a plurality of image forming apparatuses 104-118. Image forming apparatuses may be referred to as printing devices, scanning devices, information storage devices, and the like. For simplicity, the disclosed embodiments will refer to "devices" for these components of system 100. Each device may have a security status, which also may be known as security level, clearance, and the like. The security status for a device may be shown by AA, BB, CC, and XX in FIG. 1. For example, device 104 has a security status of AA, device 106 has a security status of BB, and device 108 has a security status of CC. The type of security status may determine the type and level of confidential information may be handled by the device.

In terms of confidential information, a security status of AA may indicate the highest level of security within system 100, or the ability to receive the highest level of confidential information. Device 104, for example, may receive and process the highest level of confidential information within system 100. Device 104 also may store the highest level of confidential documents as well as edit such documents. A security status of BB may indicate the second highest level of security within system 100, a security status of CC may indicate the third highest level of security within system 100, and so on. A security status of XX may indicate that no confidential information should be stored on that device.

In some embodiments, a document requiring a security status of AA may not be stored or printed on device 106 or 108. A document having a security status of BB may be stored or printed on device 104, as it has a higher security status as well as device 106. It may not be stored or printed on device 108, which has a security status of CC. Alternatively, a document may not be printed, stored, or processed on a device that does not have the exact same security status as that allowed on the device. Thus, a document having a security status of BB may not be stored or printed on device 104.

Devices 104-118 may send and receive documents over network 102. Network 102 may be a wired or wireless network supporting a protocol to exchange information between devices. Network 102 may be an intranet network in that it connects devices within an organization or company. Network 102 may communicate with an outside network in order to exchange information. In other embodiments, network 102 may be connected through the Internet. The devices in network 102 should have unique addresses such that information, documents, emails, and the like are delivered to an address corresponding with the destination device.

System 100 also includes administrator 120, server 122, and confidential document managing repository 124. Administrator 120 may control devices 104-118, such as assigning security levels, as well as managing flow within network 102. It also may set the rules applicable to system 100 stored in repository 124. In some embodiments, administrator 120 may be a module located within one of the devices within system 100. Alternatively, it may be a separate device that communicates through network 102.

Server 122 is a confidential document managing server within system 100. Server 122 includes a database connected to network 102 that stores information accessible by device 104-118 within system 100. Server 122 also may be located at a device within system 100. In other words, one of the devices may include a database and processor that acts as a server within network 102, with its own unique address and the like. Documents may be sent to server 122 for storage. Server 122 may be broken into storage locations corresponding to the security levels for the received documents and information.

Repository 124 is a confidential document managing repository. Repository 124 includes confidential information format data of one or more formats of confidential items found within documents used and exchanged in system 100. The confidential items within a document may relate to one or more confidential categories recognized by repository 124. Repository 124 also includes one or more alternative objects associated with the confidential categories that may be sent, as needed, to devices 104-118. Repository 124 also includes rules applicable to documents within system 100.

These features are disclosed in greater detail below. In some embodiments, repository 124 may be located within server 122, but acts as its own separate entity within system 100 with a unique address to send and receive information. Information within repository 124 may be accessible by administrator 120, but not any other device or entity within system 100. As can be appreciated, repository 124 has a security status that allows it to receive, store, access, process, and the like any confidential level of document.

Mobile devices 126 and 128 also may be within system 100. The mobile devices may utilize any of the devices within system 100 for printing, scanning, processing, and the like. Mobile devices 126 and 128 do not necessarily have security statuses like devices 104-118, but they may be limited to certain devices due to the security statuses. As disclosed in greater detail below, a code may be sent to a mobile device that associates with a document within system 100. Thus, mobile device 126 may receive code 126g while mobile device 128 receives code 128g. Preferably, codes 126g and 128g are graphical codes readable by the devices within system 100.

Devices 104-118 include beacons 130 installed therein. Beacons 130 indicate a location of the devices. Not all devices are at an equal distance apart. For example, device 104 may be on a third floor in a location at the north side of the building. Devices 110 may be near the same location. Device 106 may be located on the first floor at the eastern side of the office building along with devices 114 and 116. Beacons 130 indicate these physical locations. Locations of the devices and beacons may be captured in a network topology map used by administrator 120 or repository 124. Beacons 130 may be utilized to determine a best path to send a document within system 100.

Documents are received within system 100. A scanner within each device scans and generates an electronic document of the document. The disclosed embodiments then may make alterations or changes to the electronic document to hide or remove confidential information according to the rules and categories applied by repository 124. The resulting modified document may be sent to another device within system 100 for further processing, printing, or storage. The electronic document may be further modified according to the rules and categories applied by repository 124 for that device. The further modified document may be sent within system 100 for further processing, printing, or storage, and so on.

For example, electronic document A may be received at device 104. Device 104 may scan a physical copy of electronic document A or receive it from another component within system 100, such as server 122 or mobile device 126 or 128. The electronic document is modified to remove or redact confidential information identified therein. The modified document may be document B, generated by device 104. Document B, however, may not have a security status of AA. Instead, it has a security status of BB. Thus, it may not be stored or printed on device 104.

Document B may be sent over network 102 to device 106, which has a security status of BB. Document B may be further modified to remove or redact confidential information to generate document C. Document C has a security status of CC so it is sent to device 108 within system 100. The modification process is performed again to generate document X. Document X may have all confidential information redacted and only able to be stored or printed on devices having a security status of XX. Other levels of security statuses may be used with XX being the lowest. All electronic documents generated within system 100 may be stored in server 122 or repository 124. To print or access one of these documents at a device, a user may have to present a code or identification number at the applicable device to retrieve the document. For example, a user would need a code or identification number to access document A stored on device 104 that is acceptable for that level of security and confidentiality.

Figure 2:
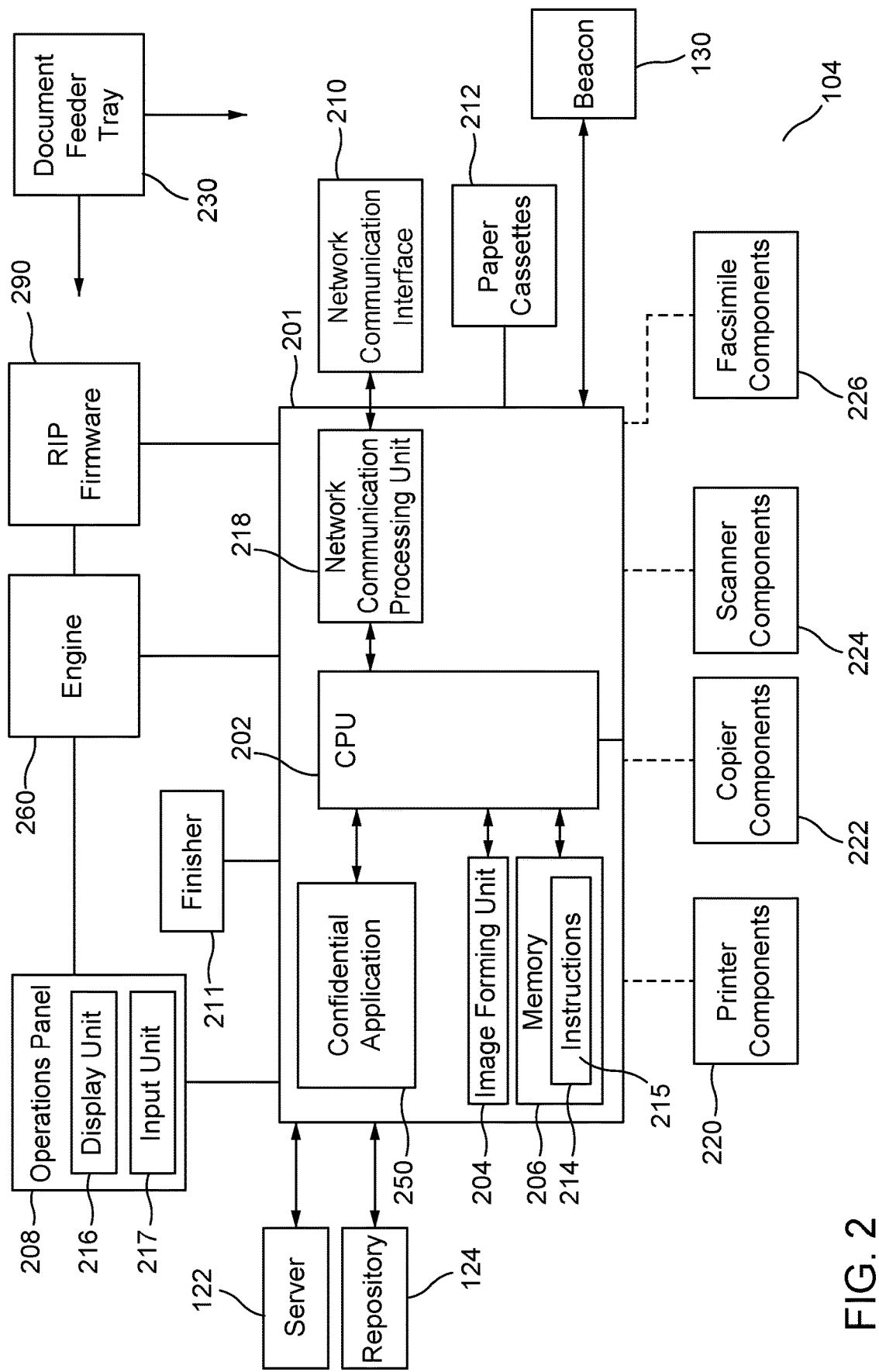
FIG. 2 illustrates a block diagram of a computer architecture for an image forming apparatus according to the disclosed embodiments.

FIG. 2 depicts a block diagram of a computer architecture for a device 104 within system 100 according to the disclosed embodiments. Device 104 is shown but the disclosed architecture may apply to any device within system 100. The architecture discloses a printing device, a scanning device, a multi-functional printer or an image forming apparatus that scans documents to perform other functions, such as printing, storing, copying, and the like. Device 104 uses engine 260 to coordinate and execute these operations.

Device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Device 104, using computing platform 201, may be configured to perform various operations, such as scanning, copying, printing, receiving or sending a facsimile, or document processing. As such, device 104 may be a printing device or a multi-function peripheral including a scanner, and one or more functions of a copier, a facsimile device, and a printer. To provide these functions, device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of device 104 to receive papers and documents to be processed. A document is placed on or in document processor input feeder tray 230, which moves the document to other components within device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine firmware 106 to perform the desired operations.

Memory unit 206 includes memory storage locations 214 to store instructions 215. Instructions 215 are executable on CPU 202 or other processors associated with device 104, such as any processors within components 220, 222, 224, or 226. Memory unit 206 also may store information for various programs and applications, as well as data specific to device 104. For example, a storage location 214 may include data for running an operating system executed by computing platform 201 to support the components within device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause device 104 to act as a printer, copier, scanner, or a facsimile device.

Device 104 also may include an operations panel 208, which may be connected to computing platform 201. Operations panel 208 may include a display unit 216 and an input unit 217 for facilitating interaction with a user to provide commands to device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216.

Device 104 also includes network communication processing unit 218. Network communication processing unit 218 may establish a network communication, such as a wireless or wired connection with other components within system 100 over network 102. CPU 202 may instruct network communication processing unit 218 to transmit or retrieve information over network 102 using network communication interface 210. As data is received at computing platform 201 over a network, network communication processing unit 218 decodes the incoming packets and delivers them to CPU 202. CPU 202 may act accordingly by causing operations to occur on device 104. CPU 202 also may retrieve information stored in memory unit 206, such as settings for device 104.

Device 104 also includes engine 260. Engine 260 may be a combination of hardware, firmware, or software components that act accordingly to accomplish a task. For example, engine 260 is comprised of the above-referenced components to scan and display a document. It may receive instructions from computing platform 201 after user inputs via operations panel 208. Alternatively, engine 260 may receive instructions from other devices and components within system 100.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the toner onto paper during operations on device 104.

The computer architecture disclosed by FIG. 2 may be configured to accomplish the operations for handling confidential documents within system 100 according to confidential application 250. Confidential application 250 may be supported by computing platform 201.

One or more CPUs 202 may coordinate the creation, generation, and tracking of the confidential documents that move throughout system 100 when confidential application 250 is launched. CPU 202 may execute instructions 215 stored in memory 206 to enable confidential application 250. Such embodiments result in device 104 acting as an administrator and computing device for system 100. These functions and features may be implemented on other devices within system 100. In other words, confidential application 250 may send instructions to other components and receive information from these components within system 100.

When confidential application 250 is executed, it may instruct CPU 202 to configure device 104 into a special purpose machine to perform the functions disclosed below as well as apply the rules for system 100 provided by repository 124. Confidential application 250 also may instruct CPU 202 to store documents in memory 206, though these documents may not be available to a user of device 104. As a special purpose machine, device 104 performs the operations specifically defined by confidential application 250 to control a plurality of devices within system 100 to generate and exchange confidential documents.

In some embodiments, server 122 or repository 124 may be put into action on device 104. As such, confidential application 250, CPU 202 and other components of computing platform 201 can access server 122 or repository 124 directly on device 104, without the need to go through network 102. Memory 206 may set aside locations in the memory storage for the databases needed for each component. As shown in FIG. 2, server 122 and repository 124 are separate components within device 104, such as separate memory structures.

Beacon 130 also is located on device 104. Beacon 130 may be a hardware or firmware component that receives location information for global positioning satellites (GPS) or other sources that is provided to computing platform 201. In other embodiments, beacon 103 is programmed to provide a location within system 100. Beacons are used to determine the distance between devices and the lengths of various paths within system 100.

Figure 3:
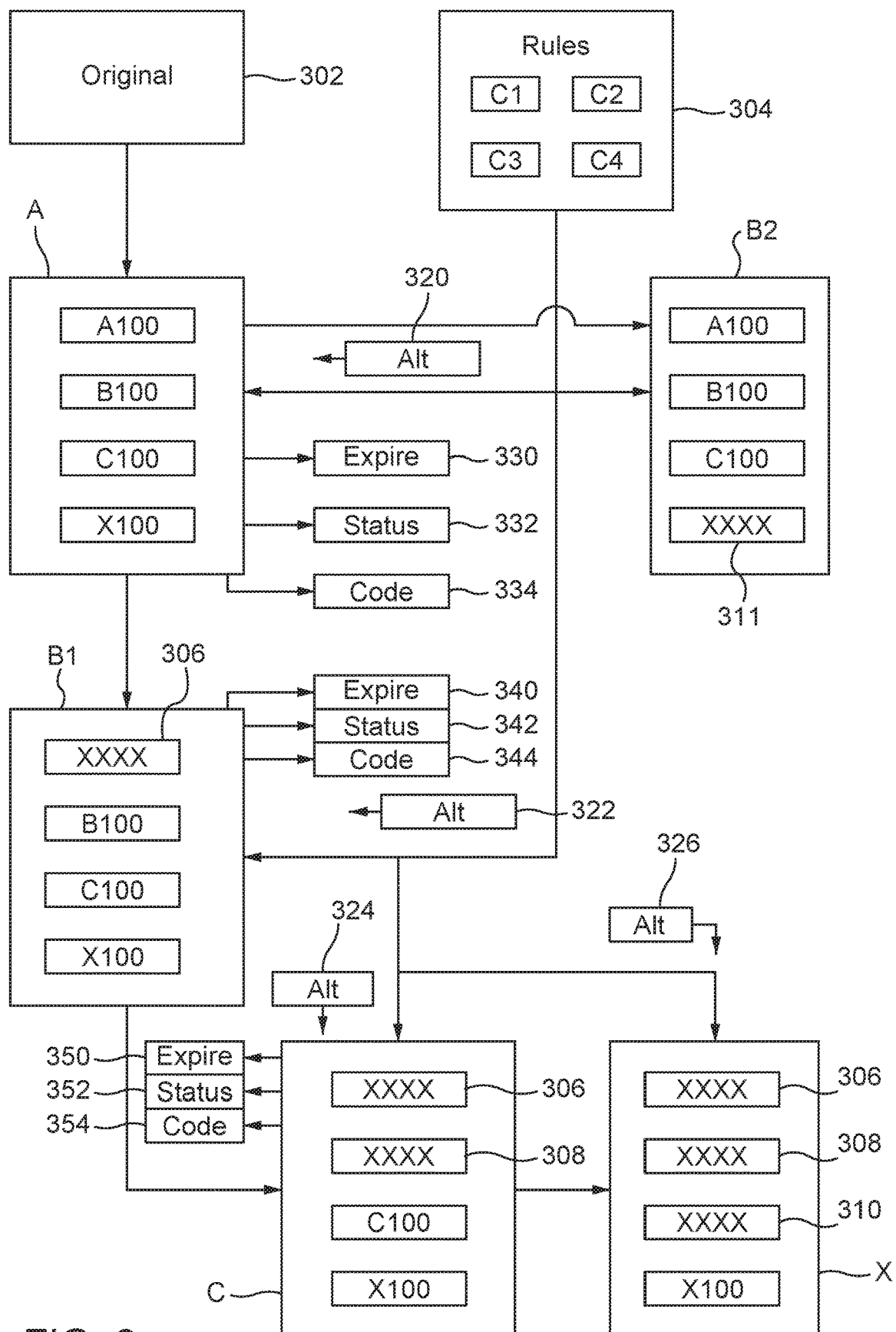
FIG. 3 illustrates a block diagram of a plurality of confidential documents generated according to the disclosed embodiments.

FIG. 3 depicts a block diagram of a plurality of confidential documents generated according to the disclosed embodiments. Where appropriate, FIG. 3 refers back to documents A, B, C, and X of FIG. 1 as well as applicable components within system 100. FIG. 3 also depicts the process to generate each document and manage confidential information within the documents.

Original document 302 is received at a device within system 100, such as device 104. Original document 302 may be scanned by the device, such as using scanner components 224. Alternatively, original document 302 is received at the device over network 102, possibly as an electronic document. It also may be received as a document from mobile device 126 or 128. Thus, original document 302 is scanned elsewhere before being provided to the device. An electronic document is generated from the scanning process. The electronic document is shown by document A in FIG. 3.

Document A is an electronic document that includes text and graphics representative of the original material on document 302. Pixels comprise the text and graphics. Groups of pixels may be recognizable using optical character recognition as one or more character blocks. Document A shows character blocks A100, B100, C100, and X100. The disclosed embodiments are not limited to these character blocks. Any number of character blocks may be present in document A.

Preferably, the character blocks include one or more alphanumeric characters. The characters may be combined to form confidential information. For example, character block A100 may represent the name of a user, character block B100 may represent the social security number of the user, character block C100 may represent the phone number of the user, and character block X100 may represent an account number for financial institution for the user. Within these character blocks, the information may have a format, such as XXX-XX-XXXX for social security number, XXX-XXX-XXXX for phone number, or 1234-567890 for account number. The name character block may include alphabetical characters and not have recognizable numerical characters. The applicable formats for the different confidential categories may be set forth in confidential document redaction rules 304.

Confidential document redaction rules 304 are retrieved from repository 124. Rules 304 includes confidential categories C1, C2, C3, and C4. The confidential categories include representations of confidential information that may be applicable to electronic document A. The confidential information also may be in alphanumeric characters, which correspond to one of the confidential categories. Using the above example, confidential category C1 may apply to confidential information for a name found in character block A100, confidential category C2 may apply to confidential information for a social security found in character block B100, confidential category C3 may apply to confidential information for a phone number found in character block C100, and confidential category C4 may apply to confidential information for an account number found in character block X100.

Rules 304 also set forth how the confidential categories are applied on electronic document A. For example, device 104 may execute the process to compare the format of confidential information within the confidential categories against the character blocks, or alphanumeric characters, in document A. The character blocks are identified based on known characteristics of character blocks and then compared to confidential information formats within the categories. Confidential information is identified in the character blocks based on the confidential categories in rules 304.

The disclosed embodiments, therefore, may retrieve confidential information format data from a confidential document management repository 124. The confidential information format data may include one or more formats of confidential items. The confidential information format data each corresponds to one of a plurality of confidential categories set forth in rules 304.

Confidential items may include user name, social security number, phone or mobile number, and bank account information. The confidential items may have a confidential information format, such as the examples provided above. Social security number confidential items may have a confidential information format of XXX-XX-XXXX. Thus, the confidential categories that are identified in the analyzed electronic document are user name, social security number, phone number, and bank account information.

Referring to document A, rules 304 identify character block A100 as having confidential information, such as the name of someone in the document. After identification of confidential information in character block A100, repository 124 sends alternative object 320 to device 104. Alternative object 320 corresponds to the confidential information to be redacted in character block A100. Device 104 overlays alternative object 320 on character block A100 so that the confidential information therein is not visible within the document. Thus, electronic document B1 is generated after the confidential information in character block A100 is redacted by alternative object 320 overlaid on document A.

Electronic document B1 is generated with redacted confidential information 306. Document B1 still includes character blocks B100, C100, and X100 with potential confidential information. Rules 304 applies confidential categories C1, C2, C3, and C4 to electronic document B1 to identify confidential information in one of the character blocks. In this instance, device 104 identifies character block B100 as having confidential information as indicated by confidential category C2. Alternative object 322 corresponding to confidential category C2 is provided by repository 124 to overlay on character block B100. After the confidential information is redacted from character block B100, electronic document C is generated with redacted confidential information 306 and 308.

The process of identifying confidential information using the confidential categories set forth by rules 304 may be repeated until all confidential information in the character blocks is redacted. Not all information in document 302 should be redacted. FIG. 3 shows electronic document X of the final iteration of the disclosed process. Electronic document C received alternative object 324 and overlaid it onto character block C100, which was identified as having confidential information. Electronic document X includes redacted confidential information 306 corresponding to the information in character block A100, redacted confidential information 308 corresponding to the information in character block B100, and redacted confidential information 310 corresponding to the information in character block C100. In the example from above, character block C100 may include confidential information correlating to the phone number of the person mentioned in document 302. The disclosed embodiment may further identify confidential information in character block X100, so that alternative object 326 is provided to redact the confidential information therein.

According to some embodiments, different categories of confidential information may be identified and redacted to generate two or more electronic documents from one analyzed electronic document. For example, electronic document B2 may be generated from electronic document B1. Rules 304 may indicate that an electronic document separate from electronic document B1 is to be generated to redact the confidential information from a different character block in electronic document A. A confidential item is identified in character block X100 and redacted using another alternative object 320. Electronic document B2 is generated with redacted information 311 as opposed to redacted information 306 in electronic document B1. In other embodiments, character blocks A100 and X100 in electronic document A may be identified and redacted to generate an electronic document having both redacted information 306 and 311.

Based on the redacted information, each electronic document includes a security status associated with the security statuses used in system 100. The security status indicates where in system 100 the document may be stored and who can access the document. As electronic document A has no redacted information, it may be given a security status 332 of AA. Electronic document A may be stored and accessed, for example, on device 104. Electronic document B has a different security status 342 as it includes redacted information. A document with redacted information should not have as high of a security status as electronic document A. Security status 342 may correspond to devices having a security status of BB in system 100. Electronic document B1 may be stored and accessed on device 106. Electronic documents C and X also have security statuses, though these are not shown.

Using the security statuses, the electronic documents generated by the disclosed embodiments may be stored, accessed, printed, viewed, and the like at different devices within system 100. Electronic document A having a security status 332 of AA may be stored on device 104 or device 114. It may not be stored on devices 106, 108, 110, 112, 116, or 118. Further, one may not access electronic document A from these devices unless he/she has a proper code or authentication. Electronic document B1 having a security status of BB may be stored on device 106. It also may be stored on device AA, which as a higher security status. In other embodiments, electronic document B1 may be limited to device 106 and not accessible at any other device shown in FIG. 1.

Electronic documents C and X also have security statuses associated with the level of confidential information in the identified character blocks. For example, electronic document C may have a security status 352 of CC, which allows it to be stored on device 108 in system 100. It may be limited to this device, or may be accessible at devices 104, 106, and 114 having higher security statuses. Electronic document X may represent a document having most, if not all, confidential information redacted therein. In some embodiments, no security status is generated for electronic document X. Consequently, electronic document X may be stored and accessed on any device within system 100. All documents and associated security statuses may be stored in confidential document managing server 122.

Other items may be generated for each electronic document. These items may be known as parameters as they limit how the document may be utilized and accessed. For example, an expiration parameter 330 may be issued with electronic document A. The expiration parameter may refer to a predetermined length of time that the document will be available. The thresholds for the expiration parameters may be related to the level of security status for the document. After an expiration parameter threshold is reached, the document is purged or deleted from system 100. Electronic document B1 corresponding to security status 342 may have an expiration parameter 340, which differs from expiration parameter 330 for electronic document A. Electronic document C corresponding to security status 352 has an expiration parameter 350. Electronic document X may not have any expiration parameters such that this document will remain available in system 100 until a command is given to delete them.

In some embodiments, the expiration parameters may relate to a predetermined length of time that the documents are available in system 100. For example, the predetermined length of time may have a first threshold of 10 days, a second threshold of 20 days, and a third threshold of 15 days. Expiration parameter 330 may be 10 days, which corresponds to security status 332 for electronic document A. System 100 may allow documents having all of its confidential information to be available for 10 days. After the 10 days, the documents having a security status for AA devices are deleted. Expiration parameter 340 may be 20 days due to electronic document B1 having confidential information redacted. It isn't as risky to have electronic document B1 available in system 100 longer than electronic document A.

Another possible expiration parameter is the number of times that a document may be printed. Documents with confidential information should not be printed as much as those with the information redacted. Thus, the number of times printed may have a first threshold of 5 times, a second threshold of 20 times, and third threshold of 10 times. Another expiration parameter may be the number of times accessed within system 100. Access may include viewing, forwarding, and other activities besides printing. The number of times accessed may have a first threshold of 5 times, a second threshold of 20 times, and a third threshold of 10 times.

Expiration parameters are calculated based on rules 304. The amount of confidential information in the generated electronic document dictates the length of the threshold before the parameter expires and the document deleted from system 100. In some embodiments, if an expiration parameter exceeds the expiration parameter threshold, then another version of the electronic document is sent to replace the one deleted from system 100. Preferably, the replacement document has a lower security status than the deleted document. Thus, the document is kept available within system 100, but with less risk of giving away confidential information.

Information regarding usage of the electronic documents may be stored on system 100, preferably at server 122. The usage information is accessed at each instance that the electronic document is retrieved. Server 122 will receive a request to check on the usage information. It adjusts the usage information accordingly for the document. Rules 304 in repository 124 are then checked to see if the usage exceeds the expiration parameter threshold. Using the length of time example, server 122 may adjust its usage information at a certain time of the day, such as midnight (12 am) Pacific Standard Time (PST). It then compares the stored documents to rules 304 to remove those that have exceeded the parameter threshold.

Codes, such as graphical codes and authentication codes, may be generated as well along with the electronic documents. The codes may be used to access or retrieve the documents based on the level of confidential information in the documents. As shown in FIG. 3, code 334 may be generated with electronic document A, code 344 generated for electronic document B1, and code 354 generated for electronic document C. Electronic document X also may have a code, though it is not shown in FIG. 3. Alternatively, electronic document X may not have a code generated as access to this document is not limited to any specific device or security status.

For example, the disclosed embodiments may generate a first graphical code as code 334 for electronic document A, a second graphical code as code 344 for electronic document B1, and a third graphical code for electronic document C. The graphical codes may be stored on the appropriate device, such as device 104 for code 334, device 106 for code 344, and device 108 for code 354. The graphical codes are used to access the corresponding documents from other devices or mobile device 126 or 128.

For example, code 334 as a graphical code 126g may be sent to mobile device 126. A user having a security status of AA requests to access electronic document A from device 106. Device 106 prompts the user to scan graphical code 126g corresponding to code 334 from mobile device 126.

System 100 receives graphical code 126g and sends the scanned code to device 104. Device 104 verifies the veracity of graphical code 126g and that it corresponds to code 334 for electronic document A stored at the device. Electronic document A may be sent to device 106 for use by the user having mobile device 126. This process may be repeated using code 344 for electronic document B1 and code 354 for electronic document C. Electronic document X does not need a code for access.

In some embodiments, codes 334, 344, and 354 are quick response (QR) codes or matrix barcodes. Using the QR codes, information on the user and device 104 may be encoded. When code 334 is scanned as a QR code on device 106, the second device may decode the graphical code scanned and retrieve information included in the graphical code. Instead of sending code 334 to device 104, device 106 can send the decoded information according to the information on device 104 as information on the destination for receipt. In other words, the QR code includes information in additional to authenticating access to electronic document A.

In other embodiments, codes 334, 344, and 354 are authentication codes used to access a document stored on another device within system 100. One enters the authentication code on a device to access the document stored elsewhere. In some embodiments, the authentication code may only be required when a request to a higher-level document is performed on a lower security status device, such as requesting electronic document B1 from device 108. Examples of authentication codes may be a password, a personal identification number (PIN), such as 4 numbers, or graphical codes. Alternatively, an authentication code may be generated along with a graphical code.

Figure 4:
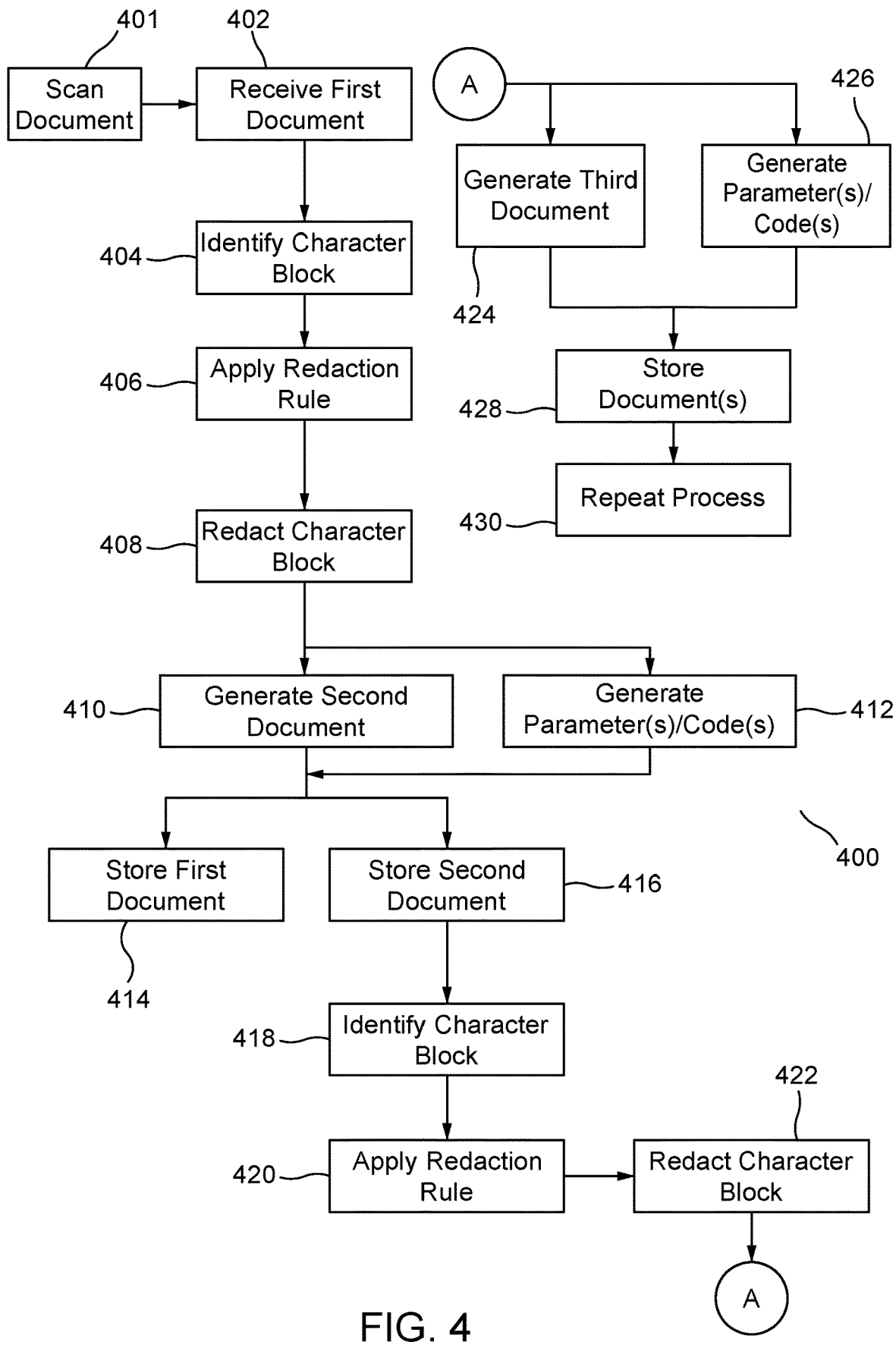
FIG. 4 illustrates a flowchart for generating documents having confidential information in the system according to the disclosed embodiments.

FIG. 4 depicts a flowchart 400 for generating documents having confidential information in system 100 according to the disclosed embodiments. Where applicable, reference is made back to the features disclosed by FIGS. 1-3 for illustrative purposes. The embodiments disclosed herein, however, are not limited to the disclosure of FIGS. 1-3.

Step 401 executes by scanning original document 302. An electronic representation is made of the text, characters, and graphics in document 302. Thus, a first electronic document is generated, such as electronic document A. Step 402 executes by receiving the first document at a device, server, or processor within system 100. For example, the first electronic document may be received at device 104, which has CPU 202 and other computer components to execute the functions disclosed below.

Step 404 executes by identifying one or more character blocks in the first electronic document. As shown in FIG. 3, electronic document A includes character blocks A100, B100, C100, and X100. The character blocks are identified within the electronic document be comparing the alphanumeric characters within the blocks to known character blocks. Alternatively, character blocks may be identified by the location in the first electronic document, such as the name and address line as well as the salutation line in a letter. Templates may be used from server 122, rules 304 of repository 124, and the like to identify the character blocks.

Step 406 executes by applying one or more redaction rules to the character blocks having confidential information in the first electronic document. This step is disclosed in greater detail below. One or more character blocks may include confidential information that needs to be redacted in order to meet the security requirements for distribution and availability on system 100. Step 406 applies at least one redaction rule to overlay the character block with confidential information with an alternative object, thereby masking the confidential information within the electronic document. Thus, step 408 executes by redacting one or more character blocks according to the appropriate redaction rule.

As a result of the redaction of confidential information, step 410 executes by generating a second electronic document, such as electronic document B1 in FIG. 3. The second electronic document has a character block redacted such that it does not have as much confidential information therein as the first electronic document. Referring to FIG. 3, electronic document B1 has character block A100 redacted. Step 412 executes by generating any parameters or codes associated with the second electronic document. Similar parameters and codes may be generated for the first electronic document as well, either here or in step 401 or 402. Further, each electronic document has a different security status to indicate what devices within system 100 may access or print the document.

Steps 414 executes by storing the first electronic document along with any associated parameters or codes at a first device, such as device 104, in system 100. Device 104 has a security status corresponding to that of the first electronic document. Device 104 supports documents having the highest level of security. For example, device 104 may be located in a secure area in a building or a secure facility on a military base. Only personnel having the highest level of security status may use device 104.

Step 416 executes by storing the second electronic document along with any associated parameters or codes at a second device, such as device 106. As shown in FIG. 1, device 106 has a security status of BB, which is lower than AA of device 104. Thus, two versions of document 302 may be processed and stored within system 100. A confidential information redaction rule is used to generate the second electronic document by redacting the confidential information. Further, the first electronic document is not stored or accessed from the second device. Electronic document A is not accessible from device 106, absent an authentication code or graphical code allowing a user access to device 104. The second electronic document, however, allows use of the information not redacted by one cleared to operate device 106.

Step 418 executes by identifying the character blocks within the second electronic document. Referring to FIG. 3, electronic document B1 includes character blocks B100, C100, and X100. One of these character blocks contains further confidential information. It may not be as sensitive as the information redacted in step 408, but still is private or damaging if made public. Step 420 executes by applying the appropriate redaction rule from rules 304 stored in repository 124. Step 418 may execute like step 406 disclosed above. Step 422 executes by redacting the identified character block from the second electronic document.

Flowchart 400 proceeds to A, which proceeds to steps 424 and 426. Step 424 executes by generating a third electronic document, such as electronic document C shown in FIG. 3. Electronic document C has character blocks A100 and B100 redacted such that it includes less confidential information than electronic document B1, or the second document. Step 426 executes by generating applicable parameter(s) and code(s) corresponding to the third electronic document.

Step 428 executes by storing the second electronic document and the third electronic document in the second device and the third device in system 100, respectively. Referring to FIG. 1, the third electronic document, or document C, is stored in device 108. Device 108 has the same security level as the third electronic document. The third electronic document should not be stored on devices 104 and 106. Step 430 executes by repeating the disclosed process of identifying character blocks, applying the redaction rule, and redacting the character block having confidential information until no further character blocks or confidential information is left in the final generated electronic document. All confidential information in original document 302 has been redacted.

Figure 5:
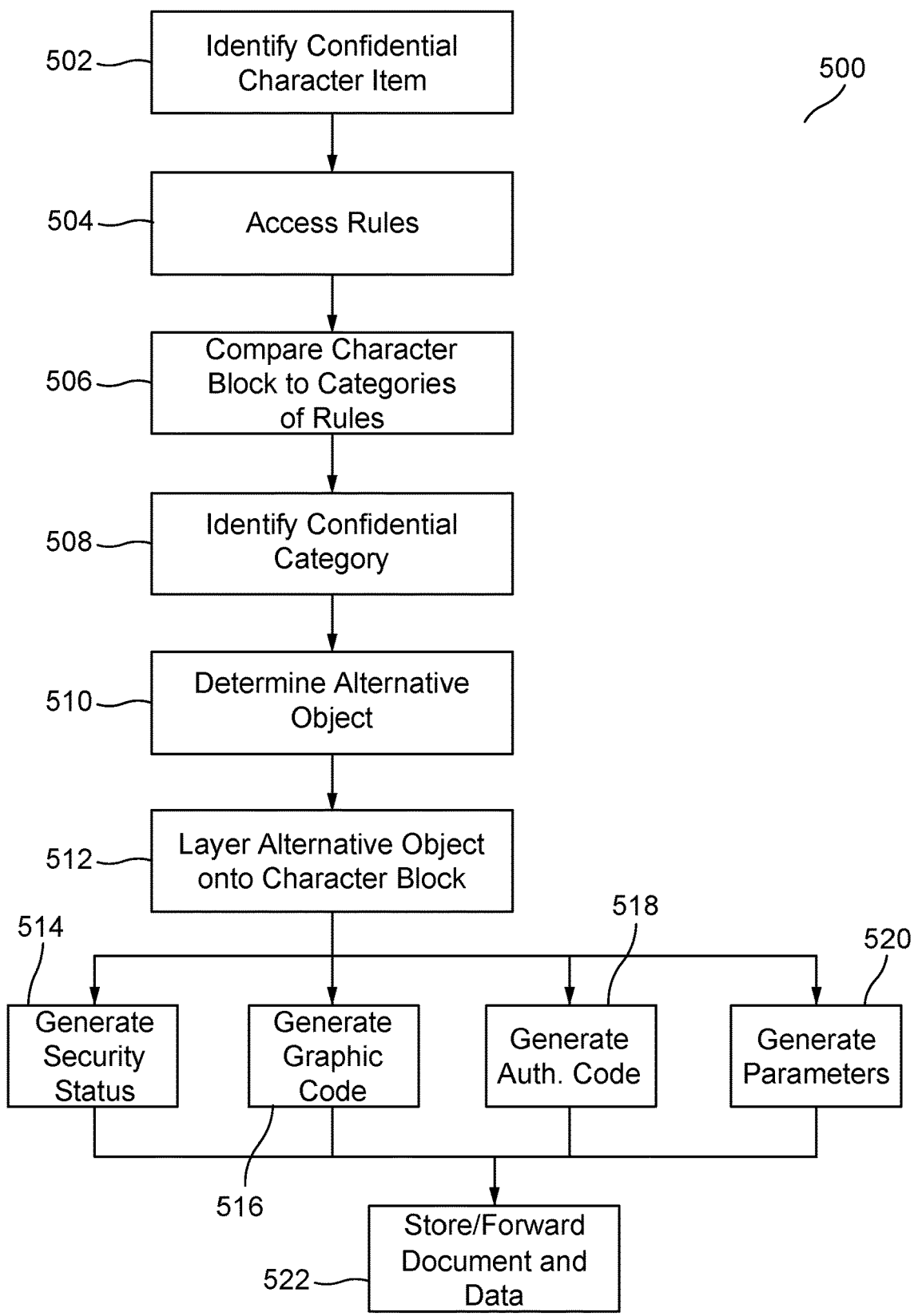
FIG. 5 illustrates a flowchart for applying a redaction rule of the rules and redacting a character block from an electronic document according to the disclosed embodiments.

FIG. 5 depicts a flowchart 500 for applying a redaction rule for rules 304 and redacting a character block from an electronic document according to the disclosed embodiments. Flowchart 500 may correspond to steps 406 and 408 as well as steps 420 and 422 in flowchart 400.

Step 502 executes by identifying a confidential character item in a character block in the document. Referring to FIG. 3, electronic document A includes character block A100. Character block A100 includes a confidential character item, as identified due to its format. The confidential character item includes confidential information, such as name, social security number, address, phone number, account numbers, passwords, and the like. Formats of confidential information to be redacted by system 100 are stored in repository 124 with rules 304. In some embodiments, the alphanumeric characters within the character block are compared to the formats of the confidential information to identify the confidential character item.

Step 504 executes by accessing rules 304. Preferably, rules 304 are located in repository 124. As disclosed above, rules 304 include confidential categories C1-C4. Additional confidential categories may be outlined in rules 304. Step 506 executes by comparing the character block having confidential information item to the confidential categories in rules 304. Each confidential category C1, C2, C3, and C4 will correspond to a certain format or type of confidential information. For example, confidential category C1 may correspond to confidential items having a name. Confidential category C2 may correspond to a confidential item in a character block having a social security number, or an XXX-XX-XXXX format. Not all confidential categories may be applied in redacting confidential information from a document.

Step 508 executes by identifying an applicable confidential category based on the comparison done in step 506. The confidential category further corresponds to an alternative object that is used to redact the confidential item in the character block. Using the example of electronic document A, alternative object 320 is determined to correspond to confidential category C1. Confidential category A pertains to a user name, as the one found in character block A100. Alternative object 320 is the item used to redact names from documents.

Step 512 executes by electronically layering the alternative object onto the character block with the confidential item. Instead of the name with alphanumeric characters, an object having a mask or other data to obscure the characters is placed in the document. The confidential item should be not viewable or printable after the alternative object is applied. Thus, the character block having confidential information is redacted from the electronic document. Referring the example above, character block A100 in electronic document A is redacted using alternative object 320. As a result, the second electronic document is generated having the alternative object in place the redacted character block.

Steps 514, 516, 518, and 520 execute in response to the generation of a new electronic document with the redacted information. These steps pertain to the various parameters and codes that may accompany the electronic document within system 100. These items may be stored with the electronic document. Step 514 executes by generating a security status for the second electronic document based on the information redacted by the alternative object. In some embodiments, the confidential categories may relate to a security status, or level. Redaction of highly sensitive information may result in a lower security status for the resulting document. The security status may determine where the generated document with redacted information is stored, accessed, printed, and who may perform these actions.

Step 516 executes by generating a graphic code for the document with the redacted information. The use of the graphic code is disclosed above. Step 518 executes by generating an authentication code that may be used to access the resulting document. Step 520 executes by generating one or more parameters, if applicable, for the resulting document. Examples of parameters are disclosed above. It should be noted that steps 514-520 preferably are executed for the first document received in step 402. In other words, electronic document A also includes a security status, graphic code, authentication code, or a parameter.

Step 522 executes by storing or forwarding the resulting document with the redacted information based on the security status or other limitation within system 100. This step may be applicable when the second electronic document is generated on a device with a higher security status. For example, electronic document B generated on device 104. Electronic document B cannot be stored on device 104 so it is sent to device 106 having the appropriate security status. As disclosed above, these steps may be repeated to generate a third, fourth, fifth, and any number of electronic documents having redacted information.

Figure 6:
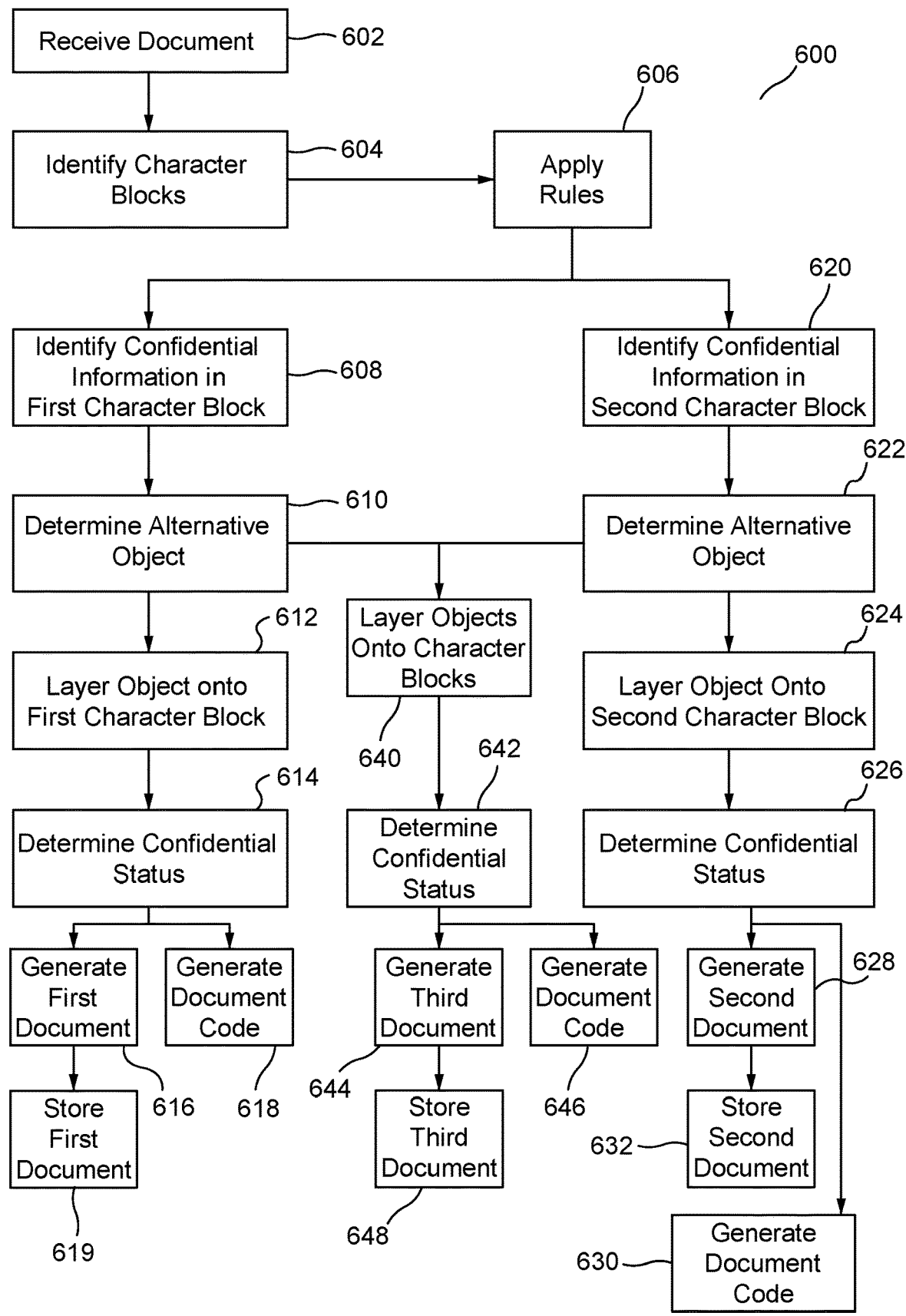
FIG. 6 illustrates a flowchart for redacting confidential information from a document to generate a plurality of electronic documents according to the disclosed embodiments.

FIG. 6 depicts a flowchart 600 for redacting confidential information from a document to generate a plurality of electronic documents according to the disclosed embodiments. Flowchart 600 may refer back to components and features disclosed in FIGS. 1-3 but is not limited to the embodiments disclosed therein. Further, flowchart 600 includes steps similar to steps disclosed in FIG. 4. For brevity, these steps are not repeated in their entirety. Flowchart 600 also results in three possible electronic documents, each with redacted confidential information.

Step 602 executes by receiving an electronic document at a device within system 100. The electronic document may be scanned by the device or sent as an electronic document to the device. Step 604 executes by identifying character blocks within the electronic document, such as character blocks A100, B100, C100, and X100 in electronic document A. Step 606 executes by applying rules 304 to redact confidential information found within the character blocks. Rules 304 may be located in repository 124.

Steps 608-619 and steps 620-632 generate and store separate documents having redacted confidential information. The process to redact the confidential information may be the same for each document. Steps 640-648 generate a third electronic document having confidential information redacted therefrom.

Step 608 executes by identifying confidential information in a first character block in the electronic document. This process is disclosed above. A confidential item is identified within one of the character blocks. Referring to FIG. 3, character block A100 includes a confidential item with confidential information. Step 610 executes by determining an alternative object to layer onto the character block based on a confidential category for the confidential item based on rules 304. Alternative object 320 may be applied to the confidential item found in character block A100. Step 612 executes by layering the alternative object onto the first character block, thereby redacting the confidential item from the scanned document. Step 614 executes by determining a confidential status for the alternative object or character block based on the confidential item. Redaction of a more sensitive confidential item will result in a lower confidential status.

Step 616 executes by generating the first electronic document with redacted information. The confidential status for the alternative object or redacted character block is applied to the first electronic document. The confidential status may be the same as the security status disclosed above. Alternatively, the confidential status for other documents generated from the scanned document may have the same security status but different confidential status based on the different information redacted. Step 618 executes by generating a first document code for the first electronic document. Referring to FIG. 3, electronic document B1 may be the first electronic document. Step 619 executes by storing the first electronic document in a device in system 100 based on its confidential status.

Step 620 executes by identifying confidential information in a second confidential item in a second character block in the electronic document received in step 602. This process is disclosed above. A second confidential item is identified within one of the character blocks, preferably one different than that identified in step 608. Referring to FIG. 3, character block X100 includes a confidential item with confidential information. Step 622 executes by determining an alternative object to layer onto the character block based on a confidential category for the confidential item. An alternative object different from alternative object 320 may be applied to the confidential item found in character block X100. Using examples provided above, alternative object 326 may be selected by rules 304.

Step 624 executes by layering the alternative object onto the second character block, thereby redacting the second confidential item from the scanned document. Step 626 executes by determining a confidential status for the second alternative object or character block based on the second confidential item. Redaction of a less sensitive confidential item will result in a higher confidential status.

Step 628 executes by generating the second electronic document with redacted information. The confidential status for the alternative object or redacted character block is applied to the second electronic document. The confidential status may be the same as the security status disclosed above. Alternatively, the confidential status for other documents generated from the scanned document may have the same security status but different confidential status based on the different information redacted. Step 630 executes by generating a second document code for the second electronic document. Referring to FIG. 3, electronic document B2 may be the second electronic document. Character block X100 is redacted. Step 632 executes by storing the second electronic document in a device in system 100 based on its confidential status. Preferably, the storage device is not the same as the one storing the first electronic document.

Step 640 executes by layering the first alternative object onto the first character block and the second alternative object onto the second character block, as identified above. The disclosed embodiments do not need to repeat the application of rules 304 or identifying confidential items within the character blocks, as these actions have already been done for the first and second electronic documents. Step 642 executes by determining a confidential status based on the information redacted by the alternative objects. Because more information is redacted than the other two documents, the confidential status should be lower than the other documents.

Step 644 executes by generating a third electronic document having both character blocks redacted. Though not shown in FIG. 3, the third electronic document would resemble both electronic documents B1 and B2 with character blocks A100 and X100 redacted. Step 646 executes by generating a document code for the third electronic document. Step 648 executes by storing the third electronic document according to the confidential status at an appropriate device in system 100. Referring to FIG. 1, device 118 may store the third electronic document. Alternatively, device 104 may store the third electronic document as it has a confidential status allowed for the security status of the device. In some embodiments, the confidential status of the generated electronic documents may be distinct such that the documents are stored on three separate devices within system 100.

Figure 7:
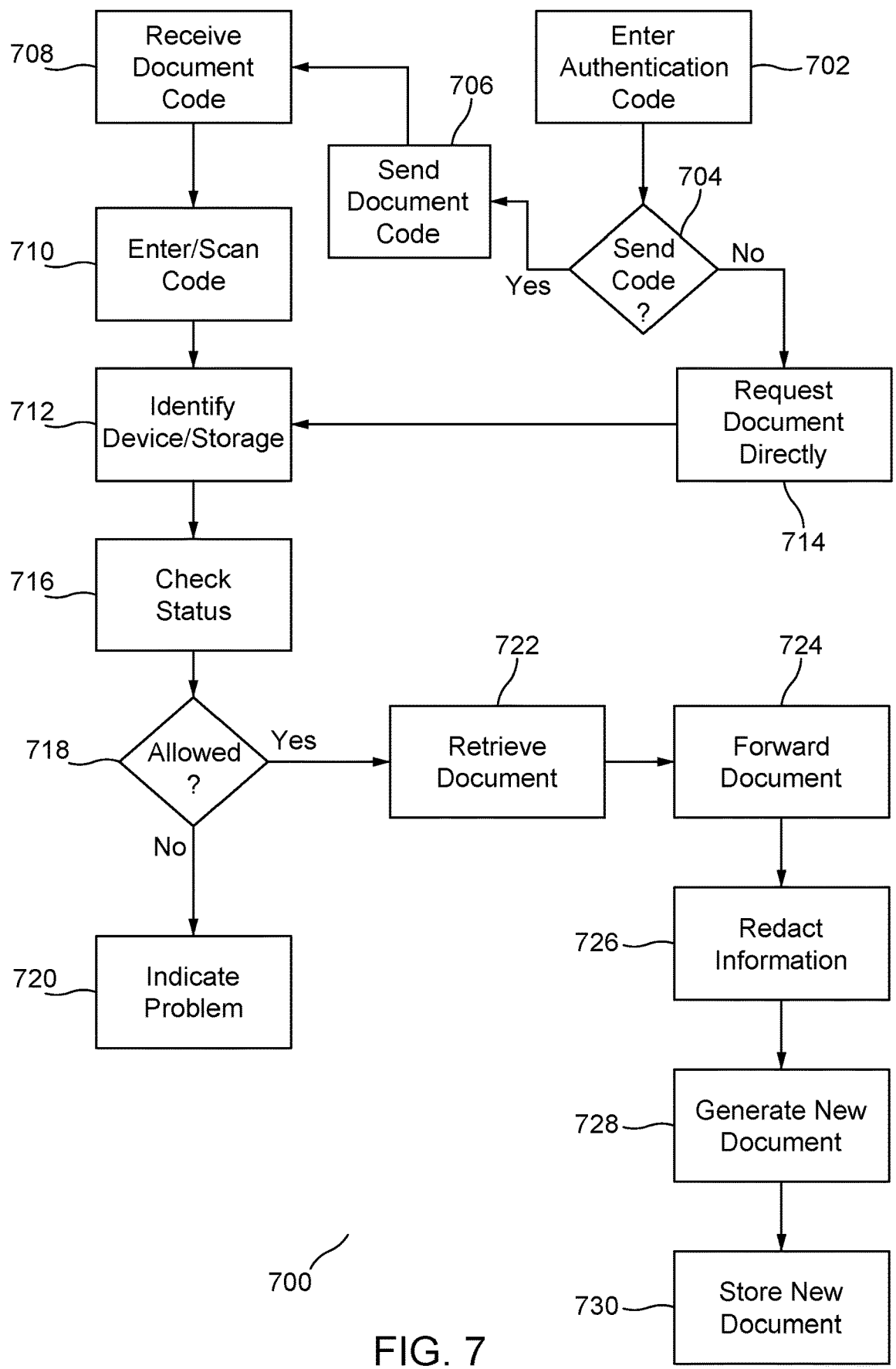
FIG. 7 illustrates a flowchart for accessing an electronic document stored on a device within the system according to the disclosed embodiments.

FIG. 7 depicts a flowchart 700 for accessing an electronic document stored on a device within system 100 according to the disclosed embodiments. In the processes disclosed by flowchart 700, a stored electronic document is accessed and retrieved. The document may or may not have redacted information. The disclosed embodiments may prevent unauthorized access to documents with confidential information but allow access to similar documents having this information redacted.

Step 702 executes by entering an authentication code for a document into a device in system 100. The device may be one of devices 104-118 or mobile devices 126 and 128. The user enters the authentication code, which is assigned to the electronic document when it is generated. Alternatively, the authentication code may be generated upon request from the user having the appropriate status level from the device. In this manner, two separate authentication codes may be sent to two different users for the same electronic document having confidential information. As disclosed above, the authentication code may be a PIN having 4 numbers, a graphical or QR code, a password, and the like.

Step 704 executes by determining whether a document code should be sent to the device for the user. In other words, the user or system determines that the device should process the document code in order to access the electronic document. If yes, then step 706 executes by sending the document code for the electronic document to the device of the user. Again, the document code may be a graphical code with information associated with the electronic document and its location within system 100.

Step 708 executes by receiving the document code at the device. In some embodiments, steps 702-706 are skipped such that the user enters the document code directly into the device. For example, the user may have a graphical code 126g for the electronic document on her mobile device 126. This code was generated with the electronic document and stored on mobile device 126. Alternatively, the user may retrieve the document code from the device storing the electronic document. For example, in order to access electronic document A, device 104 provides a document code.

Step 710 executes by entering or scanning the document code at the device. If the code is a PIN or number, then the user may enter it using a keypad or operations panel 208. Step 712 executes by identifying the device or storage location within system 100 that has the requested electronic document. For example, electronic document A may be stored and accessible from device 104. It also may be stored in server 122.

Referring back to step 704, if it is no, then step 714 executes by requesting the electronic document directly from its storage location. The authentication code may correlate with the information needed to access the electronic document. The authentication code is received by a device in system 100 and compared against information for the electronic document stored in the device, another device, or server 122 to determine the location of the document. After step 714, flowchart 700 proceeds to step 712.

Step 716 executes by checking the security or confidential status of the requested electronic document. Step 718 executes by determining whether access is allowed based on the request from the document code or the level of the user entering the authentication code. It also may determine whether the device requesting the document is allowed to receive the electronic document having confidential information. If not, then step 720 executes by indicating a problem occurred. A message may be sent to the user via her device. An error light may illuminate. In some embodiments, the requested electronic document is not sent to the device sending the request based on the document code.

If step 718 is yes, then step 722 executes by retrieving the electronic document. If the document has redacted information, then the disclosed embodiments make sure that the information is still redacted before further operations. Step 724 executes by forwarding the electronic document including any redacted information to the device receiving the document code or authentication code to request the document.

Steps 726-30 executes with the user or device making further redactions on the retrieved document, using the features disclosed above. The user may manually redact information from the electronic document. Thus, step 726 executes by redacting further confidential information from the document. Step 728 executes by generating a new electronic document with the redacted information. Step 728 may follow the embodiments disclosed above. Step 730 executes by storing the new electronic document on a device within system 100.

Flowchart 700 may be executed for any status for the document. Thus, a second document code may be used to access and retrieve a second electronic document based on a first electronic document. The second electronic document includes redacted confidential information such that the information is not viewable or printable. The second electronic document will receive a different document code or authentication code that is used to access it within system 100.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more computer systems coupled to a network capable of exchanging information and data. These computer systems also may be general-purpose computer systems. Various functions and components of the computer system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A system of devices comprising;
a plurality of devices comprising a first device having a first security status and a second device having a second security status;
a processor in communication with the plurality of devices; and
a memory coupled to and readable by the processor, the memory configured to store a set of program instructions which, when executed by the processor, configures the processor to
receive a first electronic document having at least one character block having confidential information within a plurality of character blocks;
identify the at least one character block within the first electronic document;
redact the at least one character block from the first electronic document according to a confidential document redaction rule;
generate a first document code associated with the first electronic document and the first security status;
generate a second electronic document, based on the redacted at least one character block of the first electronic document, wherein the second electronic document is not eligible for the first security status;
generate a second document code associated with the second electronic document and the second security status; and
store the first electronic document and the first document code at the first device according to the first security status and store the second electronic document and the second document code at the second device according to the second security status.

2. The system of devices of claim 1, wherein the processor is further configured to receive a selection of the first device and the second device.

3. The system of devices of claim 1, wherein the first electronic document includes a first confidential character block of the at least one character block,
the memory configured to store a set of program instructions which, when executed by the processor, further configures the processor to
identify the first confidential character block of the at least one character block, and
determine a first alternative object corresponding to the first confidential character block according to the confidential document redaction rule to generate the second electronic document by electronically layering the first alternative object on the first confidential character block.

4. The system of devices of claim 3, wherein the first electronic document also includes a second confidential character block of the at least one character block,
the memory configured to store a set of program instructions which, when executed by the processor, further configures the processor to
determine a second alternative object corresponding to the second confidential character block according to the confidential document redaction rule,
generate a third electronic document, the third electronic document comprising the first alternative object electronically layered on the first confidential character block and the second alternative object electronically layered on the second confidential character block, and
store the third electronic document at a third device of the plurality of devices.

5. The system of devices of claim 1, the memory configured to store a set of program instructions which, when executed by the processor, configures the processor to
compare the at least one character block to confidential information format data set forth by the confidential document redaction rule.

6. The system of devices of claim 5, wherein the confidential information data set corresponds to an alternative object to overlay on the at least one character block.

7. The system of devices of claim 1, the memory configured to store a set of program instructions which, when executed by the processor, configures the processor to
receive the first document code from another device, and
send the first electronic document to the another device.

8. The system of devices of claim 1, wherein the first security status indicates that the first document code is not allowed to be accessed on the second device.

9. A method for generating at least one document having confidential information in a system of devices, the method comprising:
receiving a first electronic document having at least one character block having confidential information within a plurality of character blocks;
identifying the at least one character block within the first electronic document;
redacting the at least one character block from the first electronic document according to a confidential document redaction rule;
generating a first document code associated with the first electronic document and the first security status;
generating a second electronic document, based on the redacted at least one character block of the first electronic document, wherein the second electronic document is not eligible for the first security status;
generating a second document code associated with the second electronic document and the second security status;
storing the first electronic document and the first document code at a first device according to the first security status and storing a second electronic document and the second document code at the second device according to the second security status.

10. The method of claim 9, wherein the first electronic document includes a first confidential character block of the at least one character block,
the method further comprising
identifying the first confidential character block,
determining a first alternative object corresponding to the first confidential character block according to the confidential document redaction rule, and
generating the second electronic document by electronically layering the first alternative object on the first confidential character block.

11. The method of claim 10, wherein the first electronic document also includes a second confidential character block of the at least one character block,
the method further comprising
determining a second alternative object corresponding to the second confidential character block according to the confidential document redaction rule,
generating a third electronic document, the third electronic document comprising the first alternative object electronically layered on the first confidential character block and the second alternative object electronically layered on the second confidential character block, and
storing the third electronic document at a third device of the plurality of devices.

12. The method of claim 9, further comprising comparing the at least one character block to confidential information format data set forth by the confidential document redaction rule.

13. The method of claim 12, wherein the confidential information data set corresponds to an alternative object to overlay on the at least one character block.

14. The method of claim 9, further comprising
receiving the first document code from another device, and
sending the first electronic document to the another device.

15. The method of claim 9, wherein the first security status indicates that the first document code is not allowed to be accessed on the second device.

16. A method for redacting confidential information from a document to generate a plurality of electronic documents, the method comprising:
receiving a scanned document having a plurality of character blocks;
identifying a first character block and a second character block in the scanned document;
redacting the first character block from the scanned document;
generating a first electronic document and a first document code without the redacted first character block having a first confidential status;
redacting the second character block from the scanned document;
generating a second electronic document and a second document code without the redacted second character block, wherein the second electronic document has a second confidential status and wherein the second electronic document is not eligible for the first confidential status;
storing the first electronic document and the first document code on a first device and the second electronic document and the second document code on a second device;
receiving the first document code associated with the first electronic document at the first device;
retrieving the first electronic document;
receiving the second document code associated with the second electronic document at the second device; and
retrieving the second electronic document.

17. The method of claim 16, further comprising redacting the first character block and the second character block from the scanned document, and
generating a third electronic document with the redacted first character block and the redacted second character block having a third confidential status.

18. The method of claim 16, wherein the first confidential status or the second confidential status correspond to a parameter that the first electronic document or the second electronic document is available for retrieval.

19. The method of claim 16, wherein the first character block includes a first confidential information item and the second character block includes a second confidential information item different from the first confidential information item.

20. The method of claim 16, further comprising entering the first document code or the second document code on a third device.

* * * * *